United States Patent Office 3,204,770
Patented Sept. 7, 1965

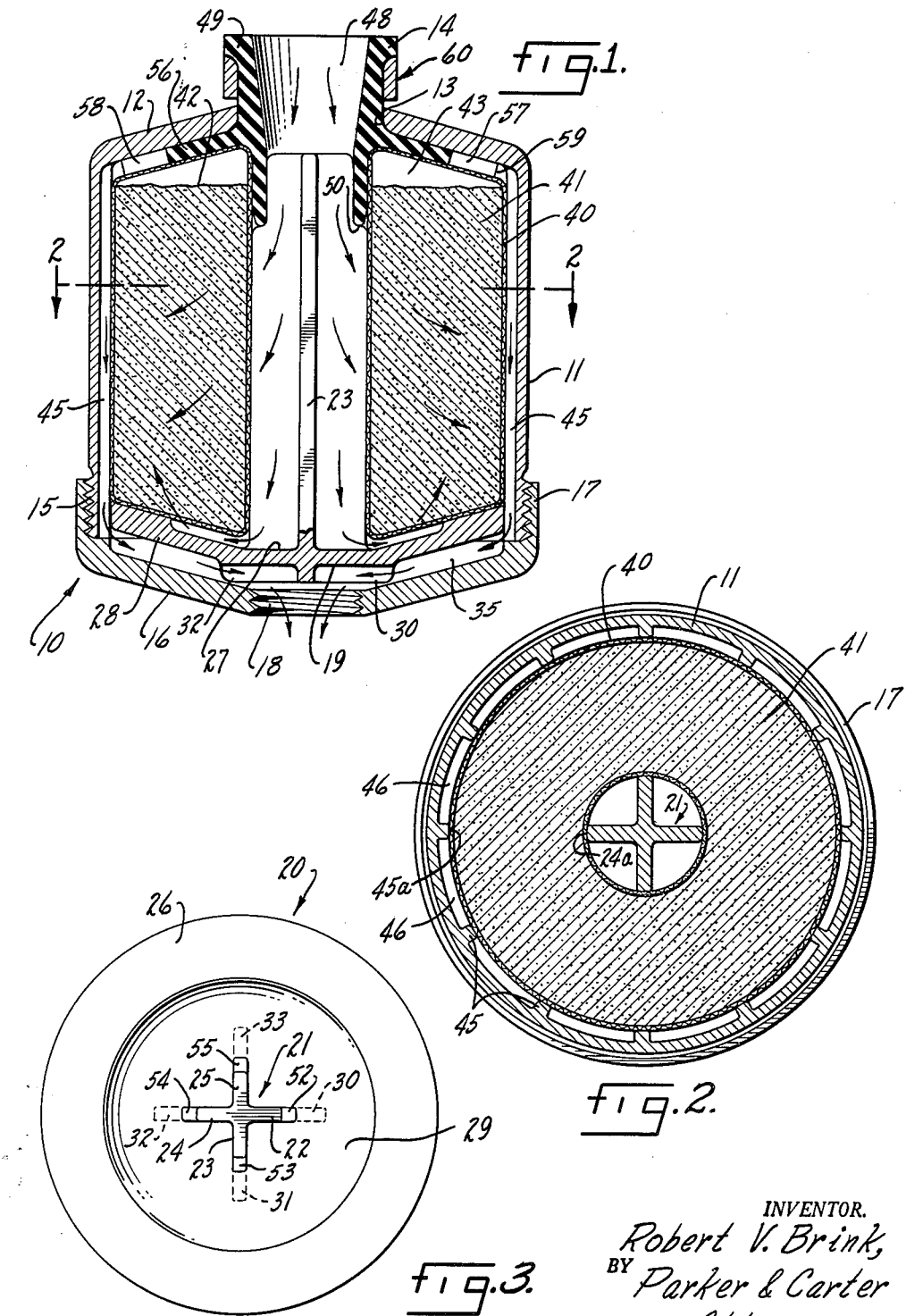
Sept. 7, 1965 R. V. BRINK 3,204,770
PORTABLE WATER SOFTENER
Filed June 21, 1961 2 Sheets-Sheet 1
INVENTOR.
Robert V. Brink,
BY Parker & Carter
Attorneys.

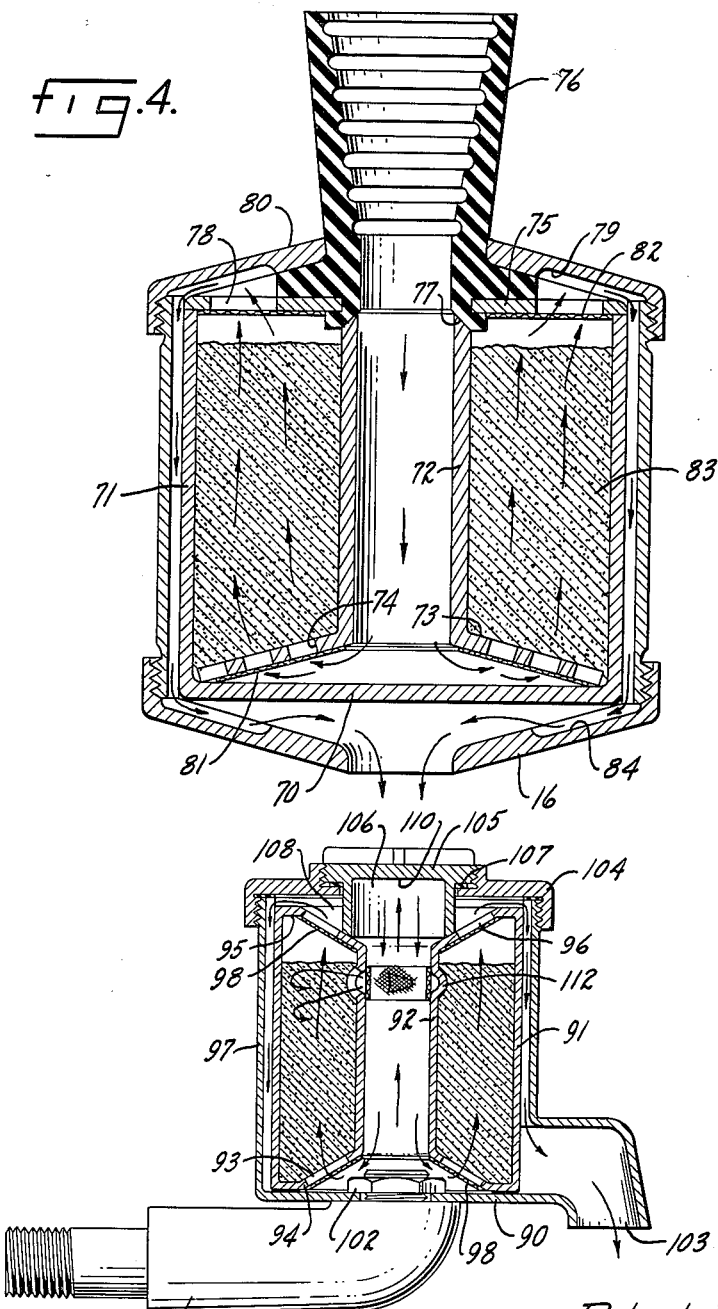

3,204,770
PORTABLE WATER SOFTENER
Robert V. Brink, 911 S. Hugh St., Plano, Ill.
Filed June 21, 1961, Ser. No. 118,582
7 Claims. (Cl. 210—282)

My invention relates to water softeners, and particularly to a small, compact, ion exchange type water softener suitable for attachment to standard water outlets and usable with normal city water pressures and flow rates.

A primary object of my invention is to provide a small, compact water softener capable of softening relatively large volumes of water to very low hardness levels with maximum efficiency.

Another object is to provide a water softener having a unique zeolite container which provides maximum exposure of the zeolite to the inflowing hard water and prevents channeling of the water through the zeolite.

Another object is to provide a water softener that is equally efficient no matter which direction water flows therethrough, said softener therefore being adaptable to different water outlet connections.

Another object is to provide a water softener in which excessive back pressure in the softener is avoided, maximum exposure of water to zeolite is provided, water flow rate is maintained at an adequate level, and which can be installed in either a horizontal or vertical position.

Another object is to provide a compact, portable water softener which can be used indefinitely by simply recharging the softener with ordinary table salt, the method of recharging being extremely simple.

Another object is to provide a compact water softener in which the pressure head of the flowing water is used to insure good contact between the water softening material and the water at all time whereby channeling is avoided and maximum hardness reduction is achieved.

Another object is to provide a compact water softener in which the pressure head and velocity of the introduced water is used to insure good contact between the water softening material and the water by a fluffing action which tends to prevent the deposit of water insoluble materials on the water softening material.

Another object is to provide a rechargeable water softener which can be easily mounted on or attached to various water apparatuses such as a shower head, washing machine, extension hose, short faucets and the like.

Another object is to provide a compact water softener which is simply rechargeable without necessitating removal of the water softener container from the faucet.

Other objects and advantages of my invention will become apparent upon a reading of the following description of the invention.

My invention is illustrated more or less diagrammatically in the accompanying figures wherein:

FIGURE 1 is a sectional view through one embodiment of my invention;

FIGURE 2 is a section taken substantially along the line 2—2 of FIGURE 1;

FIGURE 3 is a top plan view of the flow divertor of FIGURE 1;

FIGURE 4 is a sectional view to a smaller scale of another embodiment of my invention; and FIGURE 5 is a sectional view to a smaller scale of a further embodiment of my invention.

Like reference numerals will be used to refer to like parts throughout the following description of the invention.

My compact portable water softener is indicated generally at 10 in FIGURE 1. A housing is indicated at 11. The upper end of the housing has formed integrally therewith an end portion 12 which terminates in a bore 13. A faucet fitting 14 is received in bore 13. The lower end of the housing is threaded as at 15. A cover 16 forms the other end of the generally cylindrical shaped housing and is connected to the housing 11 by a threaded flange 17. A threaded opening 18 which can function either as an inlet or an outlet, depending upon which end of the softener is connected to a water outlet, is formed in the cover or end wall 16. Opening 18 facilitates connection to a threaded water tap such as might be found in a wash tub.

A support plate or water divertor is indicated generally at 20. The divertor consists essentially of an elongated quadrant section 21 having four flow dividers or quadrant pieces 22, 23, 24, 25. The flow dividers are formed integrally with a divertor or splash plate 26. The splash plate includes a flat portion 27 which is substantially perpendicular to the axis of the housing and an outer, slightly upwardly inclined 28. A bowl-shaped indentation 29 extends a substantial distance radially outwardly from the center of the splash plate for a purpose which will appear hereinafter. Four spacers 30, 31, 32 and 33 maintain the splash plate a substantial distance above end wall 16. As a result, a substantial clearance 35 is provided between the bottom of the splash plate and the interior surface of the end plate 16 which enables water to flow to outlet 18.

A water softening material container is indicated generally at 40. Essentially, the container is a screen which has been rolled into a hollow, generally annular shaped cylinder. A No. 100 mesh screen is quite suitable. A quantity of loose granular water softening material, such as zeolite, is indicated at 41. As will be noted from FIGURE 1, the container is not completely full. The level of the zeolite is indicated at 42, and a free space 43 is provided for a fluffing action as will be described later.

The configuration of the walls of housing 11 are shown best in FIGURE 2. A plurality of generally parallel longitudinal ribs 45 are formed about the inner surface. The distance between the inside surface 45a of the ribs 45 and the most exterior surface of the quadrant pieces 22–25, such as 24a, of the diverter is equal to the thickness of the zeolite container 40. The quadrant pieces and internal ribs therefore hold steady the container within the housing. The ribs serve the additional function of providing a plurality of longitudinal water passages 46 which open into the space 35 between the splash plate and bottom wall of the housing.

Faucet fitting 14 is shown in this instance as including an inwardly, downwardly diverging passage 48 which terminates at its upper end in a flange 49 and at its lower end in a hold-down ring 50. The parts are so contoured that the hold-down ring 50 bears against shoulders 52 through 55 of the quadrant pieces to thereby maintain the parts in the indicated position. A flange 56 which is directed radially outwardly and slightly downwardly is indicated at 56. Slots 57, 58 are cut in from the outer edge 59 of the flange to provide a water flow path between the top of the zeolite container and the lower side of the upper end 12 of the housing. A faucet clamp is indicated generally at 60.

The parts may be formed of any convenient material. I find it expedient, for example, to form the housing 11 and end portion 16 and faucet clamp 60 of plastic and the faucet fitting 14 of rubber. Likewise, the divertor 21 may also be formed of plastic. Alternately, any suitable metal, preferably one not corrodable by water, may be utilized. A 100-mesh screen is quite adequate for the zeolite container. It should be understood, however, that a larger or smaller mesh screen may be utilized within the scope of the invention.

An alternate embodiment of my invention is illustrated in FIGURE 4. In this construction, splash plate 70 has been formed integrally with the exterior wall 71 of the zeolite container. Inner wall 72 of the zeolite container is connected to outer wall 71 by wall 73. Wall 73 is apertured as at 74 to permit water inflow into the container. Water leaves the container through upper wall 75, which in this instance, is a plate resting at its outer edge on the upper edge of wall 71. The inner edge of wall 75 is received in a suitable slot in faucet connection 76, and the upper end of inner walls 72 seats against a conical surface 77 at the lower end of the faucet fitting. Upper plate 75 is apertured as at 78 to permit water to flow therethrough. In this instance the inner and outer walls 71, 72 of the zeolite container are solid.

After the water leaves the container through apertures 78, it passes through fluted areas 79 cut into the top plate 80 of the housing. The bottom screen 81 and the top screen 82 retain the zeolite 83 while permitting water to flow through the container. In this embodiment, the zeolite container rests directly on the bottom of the housing and water flows around the outer, lower edge of the splash plate through another fluted area 84. The direction of flow of water can be observed from the arrows.

The use and operation of my portable water softener are as follows:

In the embodiment of FIGURE 1, water enters inlet 48 and flows downwardly in the central passages within the zeolite container 41. Quadrant piece 21 divides the water into four separate streams. Since the individual flanges 22-25 are relatively thin, they provide no substantial obstruction to the flow of water. Most of the water will flow the length of the quadrant piece 21 and impinge against splash plate 26 in area 27. The water is then diverted generally radially outwardly and slightly upwardly through the depression 29 and into the zeolite container 41. It should also be understood that a portion of the water may flow from the central passage of the container directly through the walls of the container without impinging against the splash plate.

As the pressure between the bottom and the top of the zeolite container builds up, the zeolite will rise. Expansion, and consequently movement of the zeolite particles, is permitted because of the free space 43 at the top of the container. As the particles are bounced around, there is a good mixture between the zeolite particles and the flowing water so that maximum exposure of the water to the zeolite particles is provided. This movement or fluffing action of the zeolite is also important in that it eliminates the formation of channels through the zeolite which tends to reduce the effectiveness of the softening action. As the water passes through the zeolite container it is directed radially outwardly towards the housing wall 11. It passes downwardly through passages 46, past the outer edge of the splash plate 26, and then into the clearance area 35 beneath the splash plate. From area 35 it then flows through the outlet 18.

The above description is based upon the attachment of opening 48 to a water outlet. If the water outlet has a threaded connection, the softener may be merely inverted and opening 18 connected to the water outlet. In this case, the water would impinge upon the surface 19 of splash plate 26, be diverted generally radially outwardly and slightly downwardly, pass generally radially inwardly through the zeolite container and then out the opening 48. The slots 57, 58 and hold-down ring 50 permit the water to flow beneath the bed of zeolite and then generally upwardly through it to again provide a fluffing action. A portion of the water may pass directly through the zeolite container.

In the embodiment of FIGURE 4, all of the water always passes the full length of the zeolite container. Interior wall 72 of the container is solid and therefore the water must impinge against splash plate 70. The water then enters the zeolite container through screen 81 and apertures 74 and leaves through screen 82 and apertures 78. Openings of the proper size in the bottom of the container increase the velocity of the water which enters to create jets which violently agitate and fluff the zoelite. These openings are, however, of sufficiently large size to prevent any mineral deposits from the treated water from building up on the screen and interfering with the water flow. The agitating action permits passage of dirt, sediment or other water impurities and enables ion exchange to occur efficiently in the water softening material. The foregoing action represents true ion exchange activity by virtue of diffusion in the water softening material. The agitation leading to efficient diffusion can be likened to adding a teaspoon of sugar to a cup of coffee in that it would take the sugar about two hours to completely diffuse through the coffee without stirring; but if the coffee were agitated, the diffusion would be complete in several seconds.

The FIGURE 4 embodiment is also reversible. When so reversed, the entire volume of water again traverses the length of the zeolite container.

The FIGURE 5 embodiment is a container where the zeolite is in a removable and replaceable cartridge. The outer housing 97 of the container communicates with a water conduit 101 which is locked to the floor or splash plate 90 of the outer housing 97 by a lock nut 102. The outer housing is covered by a large threaded cap 104 which has superimposed thereon a second threaded cap of smaller dimensions 105. The cap 105 is sealed tightly to an opening of the cap 104 by means of a sealing ring 107. The interior of the cap 105 forms a cup cavity 106 which can be of selected size to hold a sufficient amount of salt for recharging the zeolite within the replaceable cartridge. The zeolite within the housing 97 is contained within a removable cartridge that has a central passageway. The central passageway is formed by the inner wall 92 of the cartridge, a bottom deflecting wall or splash plate 90 and an upper deflecting wall or splash plate 110. The outer wall 91 of the removable cartridge and the inner wall 92 are connected by walls 94 and 95. The connecting walls 94 and 95 are apertured at 93 and 96 and have screens 98 across such apertures. The water is introduced from the faucet 101 into the central passageway where it is deflected by walls 110 and 90 to enter the apertures and mix with the zeolite in the cartridge. The water then passes out of the cartridge through the apertures 96 into a clearing 108 located between the threaded cap 104 and the connecting wall 95. The water then enters a clearing formed by the wall of the outer housing 97 and the outer wall 91 of the removable cartridge. The softened water then passes out of the container by an exit 103 communicating with the passageway formed by the outer wall 91 of the cartridge and the wall of the housing 97. A plurality of louvers 112 can be spaced on the inside of the inner wall 92 to deflect the water within the cartridge. Such louvers 112 impart a swirling action to the water and increase the mixing action within the container.

One of the most important features of my invention is the fluffing action imparted to the zeolite. Since the zeolite offers a certain resistance to the flow of water, and this resistance continued to increase with use because dirt and sediment collect in the zeolite to aggravate the development of back pressure. The back pressure can adversely affect the function of the water softener by forcing the fitting off a faucet; it can force the water through the softener without providing softening action; it can cause breakage of the container by pressure rupture; or it can result in such a slow flow rate as to cause inadequate operation. A non-agitated zeolite would also tend to cause channels to develop in the zeolite bed, thereby packing one particle against the other and preventing the particles from becoming fully exposed to the water. In my invention, the velocity of the water causes a violent mixing action, and allows a free water flow that contacts all of the particles in the container and all the sides of said particles.

My water softener container has an ion exchange efficiency far superior to permanent installations now in use. This allows my containers to have a flow rate softening capacity equal to the large permanently installed softeners. My containers have shown an ion exchange efficiency of up to 95 percent of the practical chemical limit at full flow rates. This is far more efficient than the present permanent installations. Such efficiency rates are attained with minimum back pressure and loss of pressure head. In other words, the flow rate into the container tends to equal the flow rate out of the container. My water softener has softened 53 gallons of city water from a hardness of 15 grains to a hardness of about 2 grains at full city flow rate. It can soften water of higher hardness down to 0–2 grains at city flow rates but with a correspondingly smaller gallon capacity, thus, 35 gallons of city water can be reduced from a hardness of 22 grains to a hardness of 2 grains.

Although I have illustrated and described two embodiments of my invention, it will be apparent that many other modifications may be made within the scope of the invention. Accordingly, it is my intention that the scope of the invention be limited only by the scope of the following appended claims.

I claim:

1. A compact portable water softener suitable for connection to faucet taps or other water outlets and effective to reduce the hardness of the water to very low levels, said water softener including a generally cylindrical shaped housing, an inlet in one end of the housing, and an outlet in the other end of the housing, said inlet and outlet being generally axially aligned, one with another, an annular shaped water softening material container within the housing, said water softening material container having water pervious walls and having therein a quantity of water softening material, the volume of the water softening material being less than the volumetric capacity of the water softening material container so that the water softening material can be displaced in response to water pressure forces, the exterior diameter of the water softening material container being substantially less than the interior diameter of the housing whereby a water flow path is provided between the water softening material container and the housing, a water splash plate at the outlet end of the housing, said plate being located directly in line with the path of water flow from the inlet, said splash plate being located below the water softening material container so that the water must traverse the length of the container before impinging against the splash plate, a plurality of water channels between the splash plate and the bottom of the water softening material container so arranged that water deflected by the splash plate may pass for a substantial distance generally radially outwardly beneath the water softening material container, and spacer means for maintaining the splash plate spaced from the outlet end of the housing so that water which has passed through the water softening material container is directed towards the outlet.

2. A compact portable water softener, said softener including, in combination, a generally cylindrical shaped housing, an inlet and outlet at opposite ends of the housing, said inlet and outlet being generally axially aligned, one with another, a water softening material container within the housing, said container being generally annularly shaped and having its central aperture generally axially aligned with the inlet opening whereby water entering the housing passes substantially unobstructedly the length of the water softening material container, a water splash plate within the housing positioned between the water softening material container and the outlet and directly in line with the water flow path from the inlet, said splash plate being formed and adapted to divert water radially outwardly to an area beneath the water softening material container, that portion of the water softening material container overlying the splash plate being pervious to the water whereby the water is directed, after impingement against the splash plate, into the water softening material container, the upper end of the container being likewise water pervious so that water admitted through the end of the container adjacent the splash plate must traverse the length of the container and thereby make intimate contact with water softening material within the container, said container forming, with the housing, a plurality of water flow passages between the container and the housing, and means for spacing the splash plate away from the outlet so that water flowing towards the outlet from between the housing and water softening material container can thereafter flow to the outlet.

3. A compact portable water softener, said softener including, in combination, a water-tight housing, inlet and outlet openings in the housing providing the entrance and exit of a water flow path through the housing, said openings being on opposite ends of the housing and being generally aligned one with another so that water entering the inlet and leaving through the outlet passes through the housing, a water softening material container in the housing, said container having a pair of water pervious, generally concentrically positioned inner and outer walls, the inner wall being generally aligned with the inlet opening to form a passageway, a quantity of water softening material such as zeolite within the container, the volume of water softening material being less than the volumetric capacity of the container so that a free air space is above the water softening material, a splash plate in the passageway formed by the inner water pervious wall, the water softening material container located substantially entirely between the inlet and the splash plate whereby water flowing into the water softener traverses substantially the entire length of the container before impingement against the splash plate, said splash plate being so positioned that the bulk of the water flowing into the softener through the inlet opening strikes the splash plate and then is directed generally radially outward toward the inner surface of the housing, said splash plate and housing being constructed and arranged to define a water flow path which extends around the splash plate and terminates at the outlet opening.

4. A compact portable water softener, said softener including, in combination, a water-tight housing, inlet and outlet openings in the housing providing the entrance and exit of a water flow path through the housing, said openings being on opposite ends of the housing and being generally aligned one with another so that water entering the inlet and leaving through the outlet passes through the housing, a water softening material container in the housing, said container having a pair of water pervious, generally concentrically positioned inner and outer walls, the inner wall being generally aligned with the inlet opening to form a passageway, a quantity of water softening material such as zeolite within the container, the volume of water softening material being less than the volumetric capacity of the container so that a free air space is above the water softening material, a splash plate in the passageway formed by the inner water pervious wall, centering means for maintaining the water softening material container generally aligned with the inlet opening through which water enters the softener, the centering means being constructed and arranged so that the flow of the water is substantially unimpeded until impingement against the splash plate, said centering means including a spacer member received within the inner water pervious wall of the water softening material container, said splash plate being so positioned that the bulk of the water flowing into the softener through the inlet opening strikes the splash plate and then is directed generally radially outward toward the inner surface of the housing, said splash plate and housing being constructed and arranged to define a water flow path which extends around the splash plate and terminates at the outlet opening.

5. The compact, portable water softener of claim 3 further characterized by and including means for maintaining the splash plate out of contact with that portion of the housing adjacent the outlet opening, said means comprising a plurality of ribs which space the splash plate away from that portion of the housing adjacent the outlet opening to thereby provide a water flow path between the housing and splash plate.

6. The compact portable water softener of claim 5 further characterized in that the housing shell is formed with a plurality of ribs, said ribs defining a plurality of water flow passages communicating with the space formed between the splash plate and that portion of the housing adjacent the outlet opening.

7. The compact portable water softener of claim 6 further characterized by and including a hold-down structure for maintaining the centering means in place, said hold-down structure being formed by an extension of the inlet opening, said extension bearing against the spacer means to thereby maintain the spacer in position against the splash plate.

References Cited by the Examiner

UNITED STATES PATENTS

| | | | |
|---|---|---|---|
| 2,482,727 | 9/49 | Culligan | 210—288 |
| 2,543,481 | 2/51 | Wicks et al. | 210—452 |
| 2,758,719 | 8/56 | Line | 210—288 |

REUBEN FRIEDMAN, *Primary Examiner.*

HERBERT L. MARTIN, EUGENE F. BLANCHARD,
*Examiners.*